No. 833,984. PATENTED OCT. 23, 1906.
N. SULLIVAN.
DRAFT EQUALIZER.
APPLICATION FILED DEC. 29, 1905.
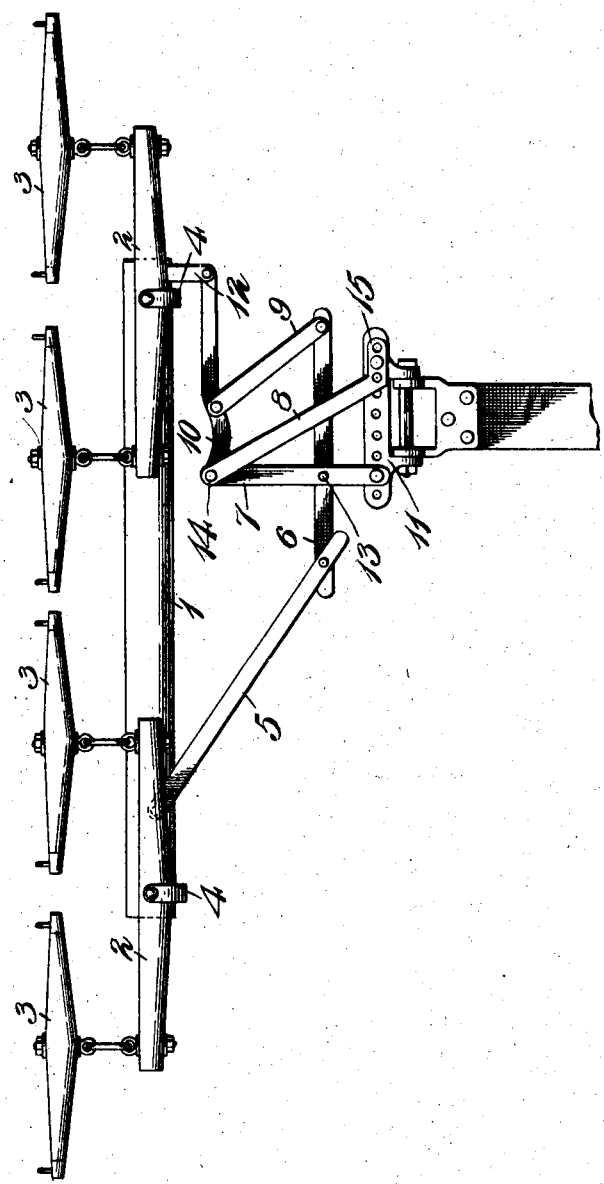
Witnesses
W. H. Durand
Geo. E. Tew.
Inventor
Neal Sullivan,
By Milo B. Stevens & Co.
Attorneys.

UNITED STATES PATENT OFFICE.

NEAL SULLIVAN, OF MEDIA, ILLINOIS.

DRAFT-EQUALIZER.

No. 833,984.　　　　　Specification of Letters Patent.　　　　　Patented Oct. 23, 1906.

Application filed December 29, 1905. Serial No. 293,750.

*To all whom it may concern:*

Be it known that I, NEAL SULLIVAN, a citizen of the United States, residing at Media, in the county of Henderson and State of Illinois, have invented new and useful Improvements in Draft-Equalizers, of which the following is a specification.

This invention is a draft-equalizer designed particularly as an evener for a four-horse team for use with plows and the like where the team is hitched off center, the purpose being to equalize the draft on each team and to pull the load in a straight line without side draft.

The construction is an improved device for the purpose, as will more fully appear from the following.

The accompanying drawing is a plan view of the invention.

Referring specifically to the drawing, at 3 are indicated the swingletrees, which are connected to the doubletrees 2, and these are connected by links 4 with the main tree 1, through which all the draft is communicated. This main tree is set off center to the extent desired to bring any one of the teams or horses in suitable position for the work. Near one end the main tree is connected by an oblique link 5 with one end of a lever 6. At the other end the main tree is connected by a link 12 with a bent lever 10, which is pivoted at the other end to the front end of the draft-bar 7 and is connected at the elbow by an oblique link 9 with the end of the lever 6 opposite to that to which the link 5 is connected. The lever 6 is pivoted at 13 to the bar 7. An oblique bar 8 is connected by a pin 14 to the front end of the bar 7 and extends at an inclination to said bar and at its rear end is provided with an offset portion 15, having several hoes to accommodate various clevises. The hitch to the clevis 11 is effected at the rear ends of the bars 7 and 8, the draft being through the bar 7. The bar 8 acts as a strut or thrust-bar to keep the equalizer in line and prevent it from swinging to the right, as it would if the side pull were not prevented in some way. The difference in the proportions of the levers 5, 6, 9, and 10 equalizes the pull with respect to the opposite ends of the main tree 1, and consequently with respect to the load on the different teams.

I claim—

1. In a draft-equalizer, the combination with the main tree and a draft-bar, of a cross-lever fulcrumed on the draft-bar and having connections at its opposite ends to the said tree, one of said connections comprising a lever fulcrumed on the draft-bar and connected to the tree and cross-lever respectively, and means to prevent side swing of the draft-bar.

2. In a draft-equalizer, the combination with a main tree, and a draft-bar, connected to the clevis, of a cross-lever fulcrumed on the draft-bar, an oblique link connecting one arm of the cross-lever and the tree, a lever fulcrumed at one end on the front end of the draft-bar and connected at its other end to the main tree and also connected to the other arm of the cross-lever, and a thrust-bar extending at an angle between the clevis and the draft-bar. to prevent side swing of the latter.

In testimony whereof I have signed my name to this specification in the presence of two subscribing witnesses.

NEAL SULLIVAN.

Witnesses:
　W. E. DRAIN,
　F. L. MORGAN.